July 14, 1942.    J. NORSTROM    2,289,549
DIAPHRAGM
Filed Aug. 23, 1939
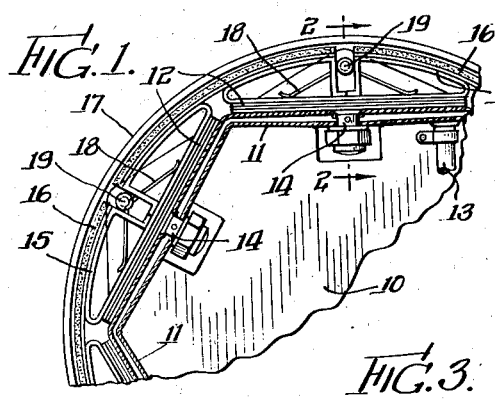
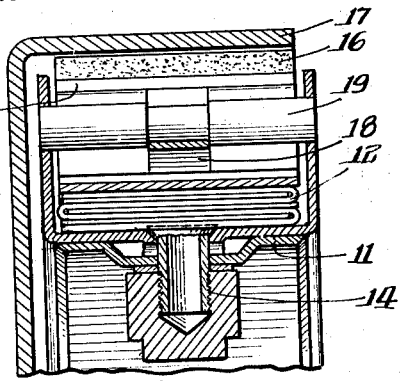
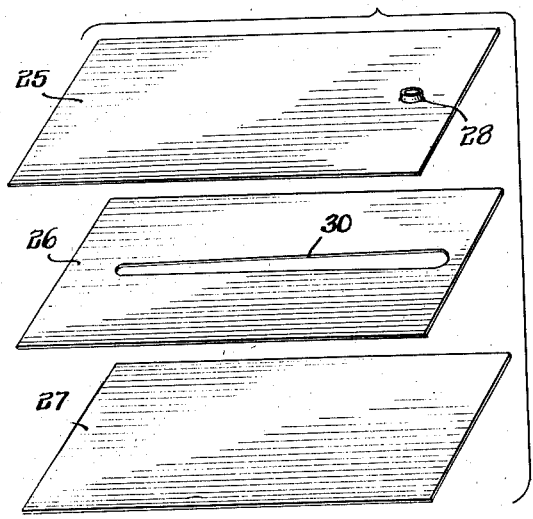
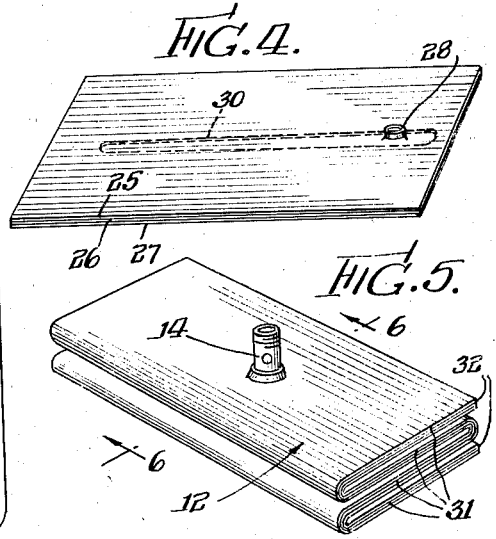
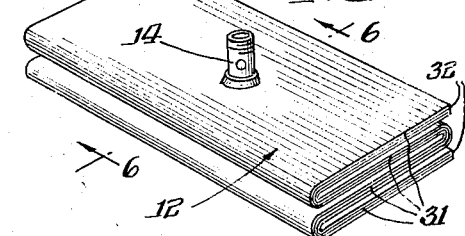
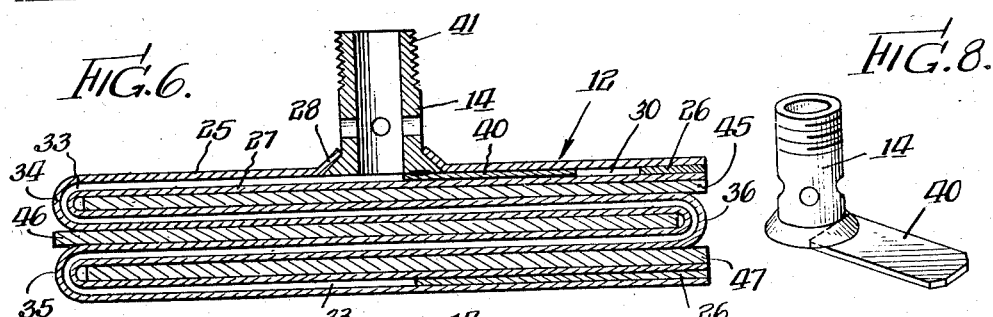
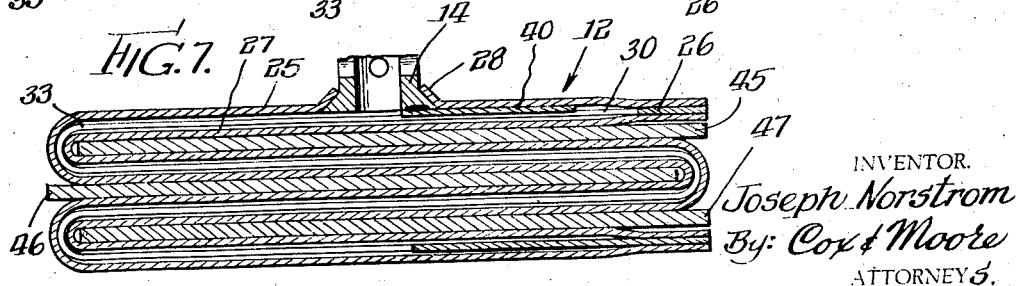
INVENTOR.
Joseph Norstrom
By: Cox & Moore
ATTORNEYS.

Patented July 14, 1942

2,289,549

UNITED STATES PATENT OFFICE 2,289,549

DIAPHRAGM

Joseph Norstrom, Newburgh, N. Y., assignor to Linderman Devices, Inc., Newburgh, N. Y., a corporation of Delaware Application August 23, 1939, Serial No. 291,561

19 Claims. (Cl. 137—157)

This invention relates to diaphragm constructions.

It is an object of the invention to provide a diaphragm structure of improved construction and of improved operating characteristics.

More specifically, it is an object of the invention to provide a diaphragm construction, particularly of the superposed metal plate folded type, which may be readily fabricated and wherein means is provided for facilitating the initial or residual flow of fluid through the diaphragm chambers when the diaphragm is in collapsed condition.

A further object of the invention is to provide means for facilitating fluid flow through the diaphragm, as above defined, but without materially increasing the volumetric capacity of the diaphragm when in collapsed or deflated position.

A still further object of the invention is to provide a superposed metal plate folded diaphragm of light weight but of greater strength and rigidity and of smooth and unwrinkled character, particularly along the welded seams thereof.

Another object of the invention is to provide improved means and methods for securing conduit coupling means to the diaphragm, through which the diaphragm inflating fluid may be introduced and expelled.

Other objects, advantages and features of the invention will be apparent from the following specification, when taken in connection with the accompanying drawing wherein a preferred embodiment is set forth for purposes of illustration.

In the drawing, wherein like reference numerals refer to like parts throughout:

Fig. 1 is a partial assembly view of a brake construction, for example, for automotive vehicle use, incorporating a diaphragm constructed in accordance with the principles of the invention.

Fig. 2 is a partial sectional view of the structure shown in Fig. 1, on the line 2—2 thereof.

Fig. 3 is an exploded view illustrating the manner of fabricated diaphragm, and more particularly showing the manner in which the diaphragm plates are juxtaposed prior to assembly.

Fig. 4 is a view showing the plates of Fig. 3 after being brought into superposed relation.

Fig. 5 is a view showing the plates after folding and with the conduit coupling means in assembled position.

Fig. 6 is a sectional view through the diaphragm of Fig. 5, on the line 6—6 thereof.

Fig. 7 is a similar view but showing the diaphragm in expanded or inflated condition, and Fig. 8 is a perspective detail view of the conduit coupling means showing its securing or diaphragm connecting devices.

Referring more particularly to the drawing, in Figs. 1 and 2 a brake construction of the automotive vehicle type is illustrated, incorporating a diaphragm constructed in accordance with the invention. The brake construction, which is of the type disclosed in the patent to W. C. Shaw No. 2,162,757, dated June 20, 1939, comprises a main support plate 10, which is stationary and is adapted to be suitably secured to the stationary axle structure of the vehicle. The support plate carries a flange structure 11 having a plurality of polygonally disposed flat faces. This flange structure serves as a support means for the respective diaphragms 12, one diaphragm being adapted to be supported by each face of the flange structure, and also as a conduit means for connecting the brake pressure line 13 to the several diaphragms. To this end a plurality of coupling means 14 are provided, one for each diaphragm. The coupling means connect the fluid channel formed interiorly of the flange structure 11 to the interiors of the respective diaphragms. It is to be understood that the brake pressure line 13 which also communicates with the interior of the flange structure, is adapted to be secured at its other end to suitable brake actuating devices adapted to build up fluid pressure when the brakes are to be applied.

Brake shoes 15 are carried by the respective diaphragms, the brake shoes being adapted upon expansion of the diaphragms to force the brake linings 16 into engagement with the rotatable brake drum 17 formed as a part of the rotatable vehicle wheel structure. The brake shoes are normally urged inwardly whereby to hold the diaphragms in collapsed condition, by a series of flexure springs 18, and the brake shoes are constrained for radial movement only by a series of guiding pins 19 secured to or formed as a part of the stationary support structure 10.

In operation, as pressure fluid is introduced into the interior channels of the flange structure 11 through the brake pressure line 13, the pressure fluid is transmitted through the couplings 14 into the interior chambers of the diaphragms. The diaphragms are caused to expand urging the brake shoes radially outwardly to bring the brake linings into contact with the drum 17 whereby to effect the braking action. Upon a release of pressure within the line 13, the springs 18 retract the shoes and collapse the diaphragms, releasing the braking action.

While the diaphragm of the present invention, as illustrated herein, is particularly adapted for use in a brake structure such, for example, as above set forth, it is to be understood that the diaphragm is of general utility and may be adapted for various uses and installations.

The diaphragm structure, and the method of making it, are illustrated in Figs. 3 to 8 inclusive, the diaphragm of the present invention being an improvement on the diaphragm structure disclosed in the patent to W. C. Shaw No. 2,104,776, dated January 11, 1938. As best shown in Fig. 3, the diaphragm is fabricated from three metal plates, an upper plate 25, an intermediate plate 26 and a lower plate 27. The upper plate is provided with a conically shaped opening 28 adapted to receive the conduit coupling means or fitting 14, Fig. 8. The intermediate plate is provided with a tapered slot 30, and the lower plate is blank.

In fabricating the diaphragm the plates are first brought into superposed contacting relation as shown in Fig. 4, and the fitting 14 inserted upwardly through the opening 28 in the top plate. The diaphragm plates are then simultaneously reversely bent into the shape shown in Fig. 5, whereby to bring the various plate sections into superposed relation. Thereafter, the peripheral edges of the plates may be welded along the side edges 31 and the end edges 32 whereby to form the completed diaphragm structure. It is to be understood that, if desired, the peripheral edges of the plates may be welded together after the plates are first brought into superposed contacting position, as shown in Fig. 4, and prior to the bending or reverse folding operations. However, it is preferred to weld the peripheral plate edges after the plates have been folded as such action insures that there will be no buckling of the plates along the welded seams. In other words, the bending of the plates prior to welding permits the various plate sections to freely slide relative to each other during the bending operations to find their own proper positions. The subsequent welding operations merely seal the plate edges and do not in any way tend to set up stresses or strains within the metal structures. It is also to be understood that if desired the plates may be individually bent into the shape as shown in Fig. 5, and thereafter interfitted and peripherally welded to form the completed diaphragm. However, it is preferred to first superpose the plates and then bend them simultaneously, as this insures that any irregularities in the bending operations will be similarly introduced into all three of the plates whereby to preclude any interference between the plates in the assembled diaphragm structure. For example, if one of the superposed diaphragm sections should be made slightly smaller than the others through inaccuracy in the bending operations, the same conditions would be simultaneously applied to all the plates and there would be no possibility of plate interference in the completed structure.

The provision of the intermediate plate 26, in accordance with the invention, strengthens the diaphragm, and more particularly strengthens it to resist bending or twisting forces, the peripheral edges of the plate 26 being welded peripherally both to the upper plate 25 and the lower plate 27, thus producing a stable structure which, while permitting ready expansion of the several diaphragm chambers, will resist or preclude detrimental twisting or bending of the diaphragm plates. The intermediate plate 26, being commensurate in size with the upper and lower diaphragm plates, uniformly spaces the plates along the entire length of the diaphragm producing a smooth, flat, firm structure free of wrinkles or irregularities. The intermediate plate may be made of relatively soft metal whereby not to interfere with the ready bending of the diaphragm plates.

The tapered slot 30 in the intermediate plate furnishes a ready means for transmitting fluid from the fitting 14 to the several superposed chambers of the diaphragm when the diaphragm is in collapsed position. This action will be best understood by reference to Figs. 6 and 7 of the drawing, and particularly to Fig. 6 which shows the diaphragm in collapsed condition. As will be seen, the tapered slot produces a passageway 33 extending through the complete diaphragm structure from the inlet fitting 14 to the lowermost expansible diaphragm chamber. The passageway 33 extends not only along the flat portions of the diaphragm, but also around the bends or folds thereof. Accordingly it is unnecessary to offset the plates or provide other special means for insuring the ready passage of fluid around the folds of the diaphragm for example as indicated at 34, 35 and 36 in Fig. 6. Due to the passageway 33, as fluid is introduced into the diaphragm through the fitting 14, all of the superposed diaphragm chambers, four in number in the particular embodiment illustrated, will be immediately and simultaneously expanded. As a result the reactivity of the diaphragm is increased and uniformity in its expansion is insured. In the absence of the passageway 33, or the provision of some similar means it is necessary for the diaphragm chamber closest to the internal connection to first expand before fluid can be transmitted to the next diaphragm chamber. This second diaphragm chamber must then expand before fluid can be transmitted to the third chamber, and this action continues until the chamber most remotely situated with respect to the inlet means is expanded. On collapse of the diaphragm this action is reversed, the most remote chamber being first collapsed, and the other chambers becoming completely collapsed in sequential relation. The passageway 33, however, permits the movement of the fluid through the diaphragm chambers even when in fully collapsed condition, thereby insuring instantaneous and simultaneous transmission of the expanding fluid to all of the diaphragm chambers.

While the passageway 33 thus acts to speed up and unify the action of the diaphragm, it is to be noted that it does not materially increase the residual capacity of the diaphragm chambers. That is, when the diaphragm is completely collapsed the fluid is entirely expelled from the several superposed chambers, except for such fluid as remains within the passageway 33 which is only of low volumetric capacity. Quick diaphragm expansion may be obtained by avoiding the complete collapse of the diaphragm, but this increases the residual or exhausted thickness and capacity of the diaphragm. The passageway 33 permits complete diaphragm collapse to minimum thickness, and yet causes only a negligible quantity of fluid to be retained in the diaphragm chambers when in collapsed condition. As will be noted from Fig. 3, the slot 30 forming the passageway 33 is tapered, the passageway being of constantly decreasing cross section, the passageway thus being at each point only as wide as is necessary to satisfy the requirements of the construction.

Referring further to the means for securing the fitting 14 to the diaphragm, as will be seen in Figs. 6, 7 and 8 the fitting is provided with a tab or extension 40 welded or otherwise suitably secured to the lower end thereof. In assembling the fitting the extension 40 is first secured thereto, and the fitting then inserted through the opening 28, in such a manner that the extension 40 will lie within the slot 30 of the intermediate plate 26 when the plates are brought into contacting superposed relation. As a result in the completed and collapsed diaphragm, as shown in Fig. 6, the fitting is prevented from rotation thus facilitating the application of nuts or other threaded members to the threads 41 of the fitting. The fitting will be held from rotation with respect to the diaphragm, but need not be welded thereto. It is to be understood that in the installation of the diaphragm for example as shown in Fig. 2, the flange of the opening 28 in the diaphragm plate 25 will be clamped to the lower conical face of the fitting 14 in a suitable fluid-tight connection. While the extension 40 may move free of the slot 30 when the diaphragm is expanded, upon collapse of the diaphragm the extension will become reseated in the slot, thus insuring that the extension will be properly seated in the slot at all times for securing purposes when the diaphragm is in collapsed condition.

As also seen in Figs. 6 and 7 of the drawing filler sheets or blocks 45, 46 and 47 are preferably arranged between the several superposed diaphragm sections. These filler sheets prevent the metal diaphragm plates from being too sharply creased along the diaphragm folds thus increasing the life of the diaphragm. They also provide a positive minimum diaphragm thickness beyond which the diaphragm cannot be collapsed. Further, these filler sheets are preferably made of plastic material applied between the diaphragm plates while in plastic condition and allowed to harden while in contact with the plates whereby upon hardening to conform accurately to all the irregularities, indentations, etc. of the diaphragm plates. By making the filler sheets conform accurately to all the irregularities and indentations on the diaphragm plates, the diaphragm plates will be caused to immediately expand upon the introduction of the expanding fluid. That is, the diaphragm plates will be unable to expand into any crevices or the like in the filler sheets. Lost motion is thus prevented and effective diaphragm enlargement takes place immediately upon the introduction of the expanding fluid.

It is obvious that various changes may be made in the specific embodiment of the invention and method steps heretofore set forth without departing from the spirit of the invention. Accordingly the invention is not to be limited to the precise embodiment and method steps described, but only as indicated in the following claims.

The invention is hereby claimed as follows:

1. A diaphragm construction comprising a superposed pair of metallic plates having a substantially reverse fold therein, said plates being of substantially the same size and shape and being sealed together at their edges whereby to form a plurality of superposed connected diaphragm chambers, and a third plate arranged between said pair of plates, said third plate being provided with an elongated passage serving to connect the diaphragm chambers when the diaphragm is in collapsed position.

2. A diaphragm construction comprising a superposed pair of metallic plates having a substantially reverse fold therein, said plates being of substantially the same size and shape and being sealed together at their edges whereby to form a plurality of superposed connected diaphragm chambers, and a third plate arranged between said pair of plates and similarly reversely folded, said third plate serving to reinforce said pair of plates and stiffen the diaphragm against twisting.

3. A diaphragm construction as defined in claim 1 wherein said elongated passage is tapered whereby to produce a passage of constantly decreasing cross section from one end to the other thereof.

4. A diaphragm construction comprising a superposed pair of metallic plates having a substantially reverse fold therein, said plates being of substantially the same size and shape and being sealed together at their edges whereby to form a plurality of superposed connected diaphragm chambers, a third metallic plate arranged between said pair of plates, said third plate being provided with an elongated passage serving to connect the diaphragm chambers when the diaphragm is in collapsed position, and a filler member arranged within the reverse fold of the diaphragm plates.

5. A diaphragm construction comprising a superposed pair of metallic plates having a substantially reverse fold therein, said plates being of substantially the same size and shape and being sealed together at their edges whereby to form a plurality of superposed connected diaphragm chambers, a third plate arranged between said pair of plates, said third plate being provided with an elongated passage serving to connect the diaphragm chambers when the diaphragm is in collapsed position, and a fitting member arranged within an opening in one of said pair of plates, said fitting being provided with a rigid extension adapted to seat within said elongated passage whereby to prevent rotation of the fitting with respect to the diaphragm.

6. A diaphragm construction comprising a superposed pair of metallic plates having substantially reverse folds therein, said plates being of substantially the same size and shape and being sealed together at their edges whereby to form a series of at least three superposed connected diaphragm chambers, and continuous means extending between all of said chambers operative while the diaphragm is in collapsed condition for maintaining predetermined plate portions along a continuous path in spaced relation to provide initial diaphragm flow passages.

7. A diaphragm construction comprising a superposed pair of metallic plates having a plurality of substantially reverse folds therein, said plates being of substantially the same size and shape and being sealed together at their edges whereby to form a series of superposed connected diaphragm chambers, and a third plate clamped between said pair of plates and similarly reversely folded, said third plate serving to reinforce said pair of plates and stiffen the diaphragm against twisting.

8. A diaphragm construction comprising a superposed pair of metallic plates having a substantially reverse fold therein, said plates being of substantially the same size and shape and being sealed together at their edges whereby to form a plurality of superposed connected diaphragm chambers, a third plate arranged between said pair of plates and peripherally sealed thereto, said third plate serving to reinforce said pair of plates and stiffen the diaphragm against twisting, and a filler member disposed between the plates at the fold therein to limit the radius of curvature of said fold.

9. A diaphragm construction comprising a superposed pair of metallic plates having a substantially reverse fold therein, said plates being of substantially the same size and shape and being sealed together at their edges whereby to form a plurality of superposed connected diaphragm chambers, and means arranged between the plates for maintaining predetermined plate portions in spaced relation, said means being provided with a continuous passageway forming a continuous communication between the superposed diaphragm chambers and into the expansion areas thereof.

10. A diaphragm construction comprising a plurality of superposed plates arranged to form a pair of superposed diaphragm chambers, the chambers being connected along at least one peripheral edge of the diaphragm structure, inlet means comprising an opening extending through the wall portion of one of said chambers whereby fluid may be introduced into the diaphragm, and means extending continuously from said inlet to the other of said diaphragm chambers operative while the diaphragm is in collapsed condition for maintaining predetermined plate portions in spaced relation to provide an initial diaphragm flow passage.

11. A diaphragm construction as defined in claim 10, wherein said superposed plates are provided with a substantially reverse fold to form said superposed diaphragm chambers.

12. A diaphragm construction comprising a plurality of superposed plates arranged to form a pair of superposed diaphragm chambers, the chambers being connected along at least one peripheral edge of the diaphragm structure, and means extending continuously between the chambers and across the major lateral extent of at least one of said chambers operative while the diaphragm is in collapsed condition for maintaining predetermined plate portions in spaced relation to provide an initial diaphragm flow passage.

13. A diaphragm construction as defined in claim 12, wherein said superposed plates are provided with a substantially reverse fold to form said superposed diaphragm chambers.

14. A diaphragm construction comprising a plurality of superposed plates arranged to form a pair of superposed diaphragm chambers, the chambers being connected along at least one peripheral edge of the diaphragm structure, and means comprising a member arranged between the plates and extending between the diaphragm chambers for maintaining predetermined plate portions in spaced relation while the diaphragm is in collapsed condition, whereby to provide an initial diaphragm flow passage between the chambers.

15. A diaphragm construction as defined in claim 14, wherein said superposed plates are provided with a substantially reverse fold to form said superposed diaphragm chambers.

16. A diaphragm construction comprising a pair of plate structures, said plate structures being peripherally secured together and being provided with substantially superposed portions whereby to form a plurality of superposed connected diaphragm chambers, and a third plate structure arranged between said first-named plate structures and similarly formed, said third plate structure being peripherally secured to said first-named plate structures whereby to form reinforcing means therefor.

17. A diaphragm construction as defined in claim 16, wherein said third plate structure is provided with a continuously extending slot providing an initial flow passage between the superposed diaphragm chambers.

18. A diaphragm construction comprising a pair of superposed metal plates peripherally secured to form a fluid-tight diaphragm chamber, a conduit fitting arranged within an opening in one of said plates through which fluid may be introduced into the diaphragm chamber, an extension member rigidly secured to the fitting and extending laterally from the fitting within the diaphragm chamber, a third plate disposed between said first-named superposed metal plates, said third plate being provided with a recess, and said fitting extension being adapted to lie within said recess when the diaphragm is in collapsed condition whereby to prevent rotation of the fitting relative to the diaphragm structure.

19. A diaphragm construction comprising a plurality of superposed metal plates connected together to form a fluid-tight diaphragm chamber, one of said plates being provided with a recess, a conduit fitting arranged within an opening in one of said plates through which fluid may be introduced into the diaphragm, an extension member rigidly secured to the fitting and extending laterally from the fitting within the diaphragm chamber, said extension member being adapted to be received within said plate recess, whereby to prevent rotation of the extension member and the fitting relative to the diaphragm.

JOSEPH NORSTROM.